March 24, 1953 W. F. WILSON 2,632,543
CLUTCH INSTALLATION FOR MOTOR VEHICLES
Filed April 4, 1947 2 SHEETS—SHEET 1

INVENTOR
William F. Wilson
BY
ATTORNEY

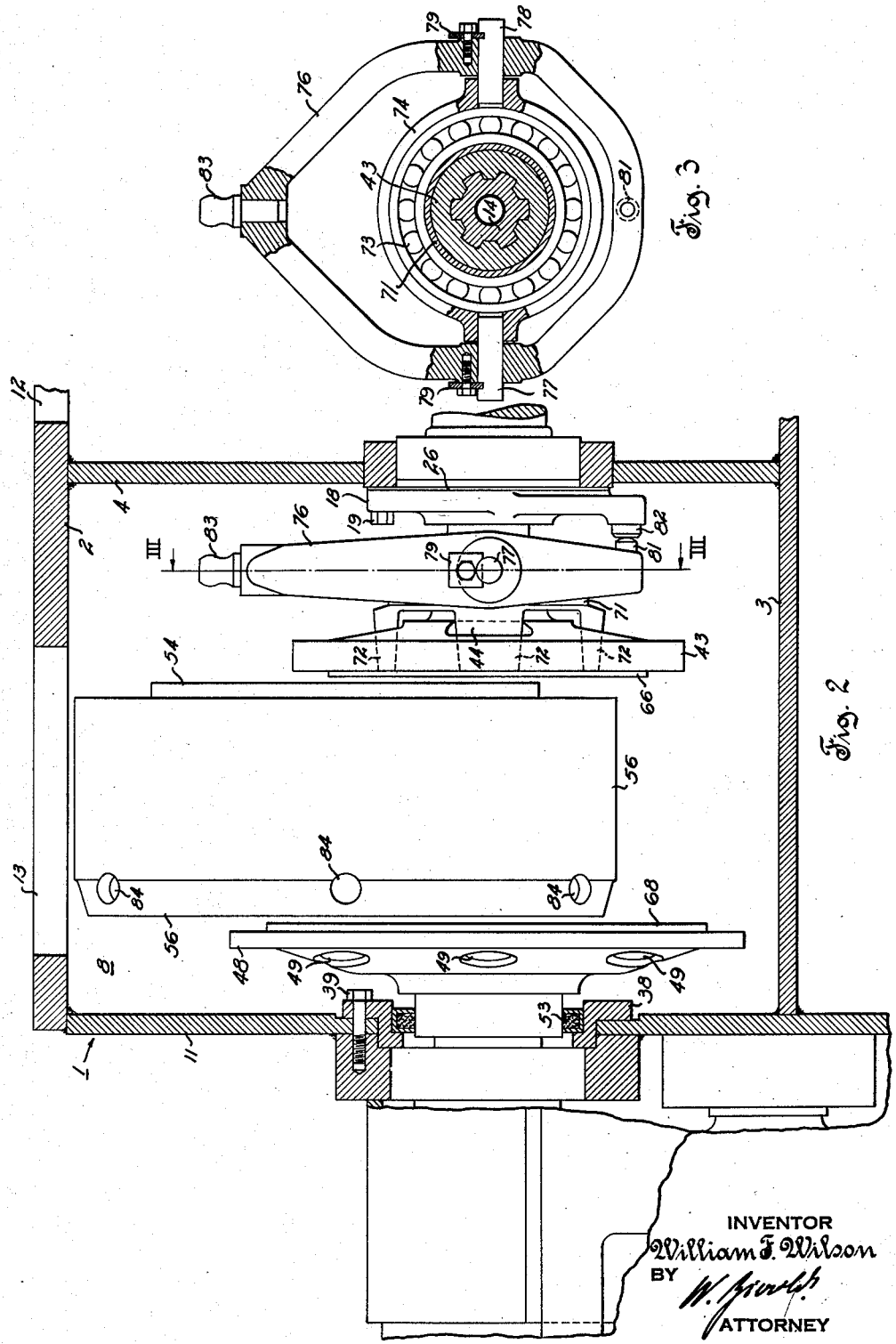

Patented Mar. 24, 1953

2,632,543

UNITED STATES PATENT OFFICE 2,632,543

CLUTCH INSTALLATION FOR MOTOR VEHICLES

William F. Wilson, Wauwatosa, Wis., assignor to Allis-Chalmers Manufacturing Company, Milwaukee, Wis., a corporation of Delaware Application April 4, 1947, Serial No. 739,279

7 Claims. (Cl. 192—69)

1

The invention relates to clutch installations, and it is concerned more particularly with an improved clutch controlled mechanism for transmitting engine power to the running gear of a motor vehicle.

In motor vehicles such as crawler tractors, which are steered by driving it has heretofore been usual to mount a pair of steering clutches in a transmission housing which also encloses gearing for transmitting power to the steering clutches, and final drive gear trains for transmitting power from the steering clutches to traction devices at opposite sides of the vehicle. In order to properly service such vehicles when parts of the clutch installation, or other parts such as the final drive pinions have become worn and require replacement, it is usually necessary to dismantle the clutch installation, and attempts have heretofore been made to reduce the amount of time and labor required for such servicing of the vehicle. However, the constructions which have been evolved as a result of such previous attempts are believed to have not been entirely successful in accomplishing the desired results without sacrificing certain other requirements which are essential from an engineering and performance standpoint.

Generally, it is an object of the invention to provide an improved clutch installation for motor vehicles, which will take care of the requirement for ready removal and replacement of worn parts in a practical and fully satisfactory manner.

More specifically, it is an object of the invention to provide an improved clutch installation in which a set of clutch disks and a spring actuated loading mechanism therefor are combined to form an assembled unit which may be moved bodily into and out of installed position, and in which a shift collar for releasing the clutch disks from the pressure of the loading mechanism, is so arranged that the mentioned assembled unit can be moved into and out of installed position without requiring dismounting of the shift collar from its installed position.

A further object of the invention is to provide a readily connectable and disconnectable precision mounting for a clutch unit of the mentioned character, which will center such unit in the installation with a high degree of accuracy and thereby insure efficient and trouble-free functioning of the installation under severe operating conditions such as are encountered in heavy duty motor vehicles, and more particularly in connection with the steering clutches of a crawler tractor.

A further object of the invention is to provide

2 an improved clutch installation of the character set forth incorporating a multiple disk clutch assembly and in which said clutch assembly is properly ventilated for adequate heat dissipation.

A further object of the invention is to provide an improved clutch installation of the hereinbefore mentioned character, which is relatively simple and which, in particular, does not require an intermediate shaft between the driving and driven shafts of the installation.

A further object of the invention is to provide an improved steering clutch installation for motor vehicles, which affords ready removal not only of the steering clutches but also of the gearing through which power is transmitted to and from the steering clutches.

A further object of the invention is to provide a steering clutch installation of the above mentioned character, in which a clutch assembly and a throw-out mechanism therefor are arranged in an axially space saving relation to each other, so that the transmission housing which usually encloses a pair of such clutch assemblies and throwout mechanisms may be kept at a desirably short transverse width.

These and other objects and advantages are attained by the present invention, various novel features of which will be apparent from the description herein and from the accompanying drawings disclosing an embodiment of the invention, and will be more particularly pointed out in the appended claims.

In the drawings:

Fig. 2 is an elevational view taken in the same direction as Fig. 1, and showing a clutch unit of the installation in partly removed condition; and Fig. 3 is a view taken on line III—III of Fig. 2 and showing parts of a clutch throw-out mechanism.

Figure 1:
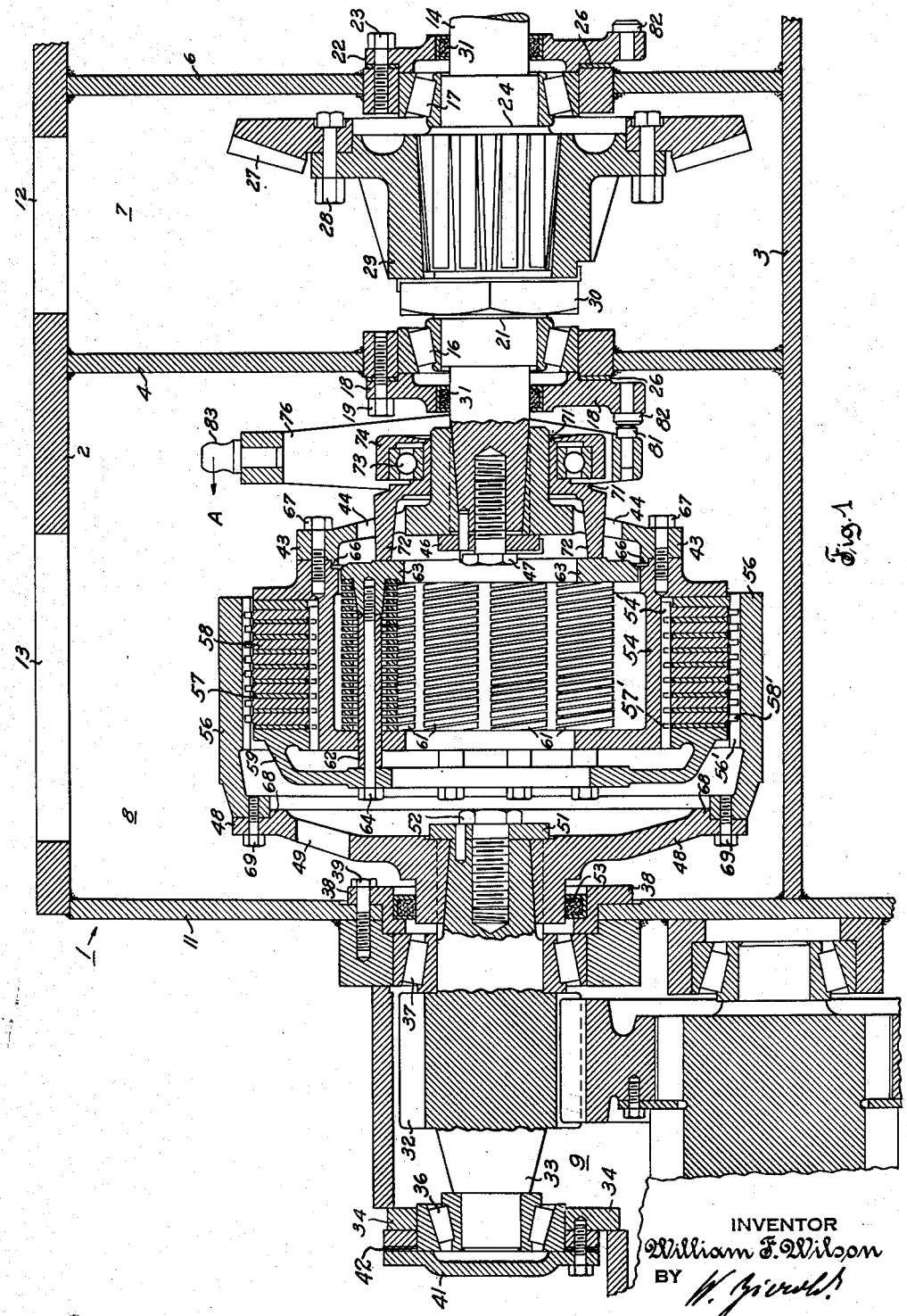
Fig. 1 is a view of a steering clutch and gear installation for a crawler tractor, the installation being shown in section on a vertical transverse plane through the tractor.

The mechanism shown in Fig. 1 is intended for transmitting driving power to a conventional track mechanism of a crawler tractor, and while such a tractor as a whole is not shown in the drawings, it will be understood that it is equipped with two such track mechanisms, one at each side, and that the clutch installation shown in the drawings relates to the track mechanism at the left side of the tractor. A second clutch installation conforming with the principles of construction and operation disclosed herein is preferably employed to transmit power to the track unit at the right side of the tractor, and for that purpose the parts of the clutch installation at the left side of the tractor which are shown in the drawings will be duplicated and correspondingly arranged at the right side of the tractor.

A transmission housing, partly shown in Figs. 1 and 2 and generally indicated by the reference character 1, is constructed in the form of a fabricated welded structure, and comprises top and bottom walls 2 and 3, and partitions 4 and 6, the space between the top and bottom walls and partitions defining a central compartment 7. At the left side of the central compartment 7, the transmission housing has a clutch compartment 8 and a final drive gear compartment 9, separated from each other by a vertical wall 11. Apertures 12 and 13 in the top wall 2 afford access to the central compartment 7 and to the clutch compartment 8, respectively, for assembly purposes, and these apertures are normally closed by covers, not shown, in conformity with conventional practice.

A driving shaft 14 extends axially through the central compartment 7 and is rotatably mounted on the partitions 4 and 6 by conical roller bearings 16 and 17. The outer race of the roller bearing 16 abuts a bearing retainer 18 which is secured to the partition 4 by cap screws 19, and the inner race of the bearing 16 abuts a shoulder 21 of the shaft 14, the arrangement being such as to limit axial displacement of the shaft 14 to the left, that is, toward the clutch compartment 8. The outer race of the roller bearing 17, on the other hand, abuts a bearing retainer 22 which is secured to the partition 6 by cap screws 23, and the inner race abuts a shoulder 24 of the shaft 14, the arrangement of the bearing 17 being such as to limit axial displacement of the shaft 14 toward the right, that is, toward a clutch compartment which is formed at the right of the central compartment 7 and corresponds to the clutch compartment 8. Shims 26 are interposed between the bearing retainer 18 and the partition 4, and between the bearing retainer 22 and the partition 6 to provide for proper adjustment of the bearings 16 and 17 which will rotatably secure the shaft 14 in axially fixed position relative to the housing 1 without appreciable axial play.

A bevel ring gear 27 within the compartment 7 is secured by bolts 28 to a hub 29 which has a splined tapered connection with the shaft 14 and is retained in axially fixed position by a nut 30. The bevel ring gear 27 forms part of a conventional mechanism, not shown, for transmitting power from the tractor motor to the driving shaft 14. Rotary shaft seals 31 of conventional construction are operatively interposed between the shaft 14 and the bearing retainers 18 and 22, respectively, to prevent passage of oil from the central compartment to the clutch compartments.

Referring to the left side of Fig. 1, a final drive pinion 32 is integrally formed with a driven shaft 33 which is rotatably mounted on the housing wall 11 and on an opposite end wall 34 of the final drive compartment 9 by means of conical roller bearings 36 and 37. The outer race of the roller bearing 37 abuts a bearing retainer 38 which is secured inside of the clutch compartment 8 to the wall by cap screws 39, and the inner race of the roller bearing 37 abuts the adjacent end of the pinion 32, the arrangement being such as to limit axial displacement of the driven shaft 33 toward the right, that is, in the direction toward the driving shaft 14. The outer race of the roller bearing 36, on the other hand, abuts a cap 41 secured to the end wall 34, and the inner race of the bearing 36 abuts an adjacent shoulder of the driven shaft 33, the arrangement being such as to limit axial displacement of the driven shaft 33 toward the left, that is, away from the driving shaft 14. Shims 42 are interposed between the cap 41 and the end wall 34 for proper adjustment of the roller bearings 36 and 37 which will rotatably secure the driven shaft 33 in axially fixed position without appreciable axial play relative to the housing 1 and relative to the driving shaft 14.

The pinion 32 forms part of a conventional final drive mechanism for transmitting power to a self-laying track unit, not shown, at the left side of the tractor.

The bearings 16 and 17 for the driving shaft 14 and the bearings 36 and 37 for the driven shaft 33 are accurately aligned on a common axis, preferably by boring the seats for the outer races of those bearings on the housing 1 in one setting. The driving and driven shafts 14 and 33 are relatively rotatable about said common axis and have relatively opposed ends within the clutch compartment 8 at a relatively wide axial spacing from each other, the driven shaft 33 extending axially a relatively short distance into the clutch compartment 8 from the left and the driving shaft 14 extending axially a somewhat larger distance into the clutch compartment 8 from the right. An axially fixed driving hub member 43 is non-rotatably secured to the portion of the driving shaft 14 within the clutch compartment 8. The driving hub comprises an axially extended sleeve portion and a radial web portion substantially in the form of a disk and which has four axial apertures 44 at a radial distance from the central sleeve portion and equally spaced circumferentially of the driving hub member 43. The central sleeve portion of the hub member is spline fitted upon a conical end portion of the driving shaft 14 and retained in axially fixed position by means of a thrust washer 46 which is doweled to the driving shaft 14 and drawn up against the hub member 43 by a cap screw 47.

An axially fixed driven hub member 48 is non-rotatably secured to the portion of the driven shaft 33 within the clutch compartment 8, the driven hub member comprising an axially extended sleeve portion and a radial web portion substantially in the form of a disk and which has a number of apertures 49 (Fig. 2) at a radial distance from the central sleeve portion and which are equally spaced circumferentially of the driven hub 48. The central sleeve portion of the driven hub is spline fitted upon a conical end portion of the driven shaft 33 and retained in axially fixed position by means of a thrust washer 51 which is doweled to the driven shaft 33 and drawn up against the hub member 48 by a cap screw 52. A rotary shaft seal 53 of conventional construction is operatively interposed between the axially extended sleeve portion of the driven hub member 48 and the bearing retainer 38 to prevent passage of lubricant from the final drive gear compartment 9 into the clutch compartment 8.

Operatively mounted between the driving and driven hub members 43 and 48 is a friction clutch unit for selectively establishing and interrupting a driving connection between the driving and driven shafts 14 and 33, the relatively opposed ends of said shafts and the relatively opposed axially inner faces of the hub members being spaced a predetermined relatively wide axial distance from each other to provide a space of suitable axial width to accommodate the clutch unit, and the latter being adapted for radial movement into and out of said space, as will be described more fully hereinbelow.

The clutch unit, as shown in the drawings, is of the multiple disk type and comprises an inner drum 54, an outer drum 56, an axially compressible assembly of driving and driven clutch disks 57 and 58, and a loading mechanism for said clutch disks which is operatively mounted on the inner clutch drum 54. In conformity with established practice, the inner clutch drum 54 has a series of external axially extending splines 54' which engage internal teeth 57' of the driving clutch disks 57, and the outer drum 56 has a circumferential series of internal axially extending splines 56' which engage external teeth 58' of the driven clutch disks 58. At the end of the inner drum adjacent to the driving hub member 43, an abutment flange for the stack of clutch disks 57 and 58 is integrally formed with the inner drum 54, the outside diameter of said flange being shorter than the inside diameter of the splined portion of the outer drum 56 to permit axial movement of the outer drum 56 to the right in Fig. 1 over the abutment flange of the inner drum 54, such axial movement of the outer drum relative to the inner drum being accommodated by the splined connection between the driven clutch disks 58 and the outer drum 56.

The mentioned loading mechanism for the disk assembly 57, 58 comprises a thrust plate 59 and a series of axially arranged coil springs 61 which bear upon a radial inwardly extending flange portion of the inner drum 54 and are connected in thrust transmitting relation with the thrust plate 59. For that purpose, a series of axially slidable spacer tubes 62 are mounted in axial holes of the inwardly extending flange portion of the inner drum 54 coaxially with the coil springs 61, respectively, and an abutment ring 63 within the drum 54 is drawn up against the spacers by a series of axial bolts 64, the coil springs 61 being centered on axial lugs of the abutment ring 63 and exerting pressure upon the latter, which pressure is transmitted through the heads of the bolts 64 to the thrust plate 59 and effective to compress the clutch assembly 57, 58 between the pressure plate 59 and the outwardly extending abutment flange of the inner drum 54. In the condition of the clutch unit as shown in Fig. 1, the coil springs 61 are effective to exert the required pressure upon the disk assembly 57, 58 so as to establish a driving connection between the clutch drums through the disk assembly 57, 58. Axial inward movement of the abutment ring 63 toward the driven hub member 48 may be effected by a clutch throw-out mechanism which will be described more fully hereinbelow, and such axial inward movement of the abutment ring will release the pressure of the thrust plate 59 upon the disk assembly 57, 58 and thus be effective to interrupt the driving connection between the inner and outer clutch drums.

As stated hereinbefore, the clutch unit comprising the inner and outer clutch drums 54 and 56, the disks 57, 58 and the loading mechanism 59, 61, 62, 63, 64, is operatively mounted between the driving and driven hub members 43 and 48, and for that purpose provisions are made as follows:

At the end of the inner clutch drum 54 adjacent to the driving hub member 43, an annular recess is formed at the inner side of the drum for the reception of an annular centering bead 66 which is integrally formed with the hub member 43 and extends axially from the inner face of the latter. The bead 66 and the corresponding recess of the inner clutch drum 54 cooperate to center the inner clutch drum in accurately concentric relation with the common axis of the driving and driven shafts 14 and 33, and the inner clutch drum 54 is axially secured to the driving hub member 43 by detachable fastening means which are shown in the form of a circumferential series of cap screws 67. The hub member 43 has a circumferential series of axial holes at the periphery of its radially extending web portion and the shanks of the cap screws 67 extend through these holes and are screwed into tapped holes of the inner clutch drum 54, to draw the inner clutch drum 54 axially against the driving hub member 43 and keep it in the centered position which is determined by cooperation of the centering bead 66 with the annular recess of the inner clutch drum 54.

The mounting of the outer clutch drum 56 on the driven hub member 48 is similar to the mounting of the inner clutch drum 54 on the driving hub member 43, that is, the driven hub member 48 has an annular centering bead 68 integrally formed therewith at its axially inner face and which cooperates with an adjacent inwardly extending flange of the outer clutch drum to center the latter in accurate concentric relation with the common axis of the driving and driven shafts 14 and 33. The inwardly extending flange of the outer clutch drum also axially abuts a radially extending peripheral portion of the driven hub member 48 at the axially inner side of the latter, and the outer clutch drum 56 is axially secured in fixed position on the driven hub member 48 by detachable fastening means which are shown in the form of a circumferential series of cap screws 69.

The clutch throw-out mechanism which has been mentioned hereinbefore is mounted in the clutch compartment 8 at the right side of the clutch unit and is constructed as follows:

A thrust collar 71 surrounding the central axially extended portion of the driving hub member 43 is connected in supported and axially slidable relation with the latter, the axially extended portion of the hub member having a cylindrical outer surface, and a cylindrical bore in a central hub portion of the thrust collar 71 having a sliding fit on the cylindrical outer surface of the axially extended sleeve portion of the driving hub member 43. At its outer periphery, the thrust collar 71 has four spaced thrust fingers 72 which extend axially through the apertures 44 of the driving hub member 43 and are abuttable endwise with the abutment ring 63 of the clutch unit.

The axially extended hub portion of the thrust collar 71 carries a ball bearing 73 which in turn is mounted in an annular cage 74 surrounding the hub portion of the thrust collar 71. The inner race of the ball bearing 73 is press fitted upon the hub portion of the thrust collar 71 and at its axially inner end abuts a shoulder of the thrust collar 71. The outer race of the ball bearing 73 is seated at its axially outer end against a shoulder of the cage 74, so that movement of the cage 74 in the direction toward the driving hub member 43 will be transmitted through balls on inner race of the ball bearing 73, to the thrust collar 71, and the thrust fingers 72 may be urged into cooperative engagement with the abutment ring 63.

Referring to Fig. 3, the cage 74 is encircled by a polygonal frame 76 which serves as a shift yoke and which is pivotally supported on the cage 74 by means of trunnions 77 and 78. The trunnion 77 is mounted in a bore at one side of the shift yoke 76 and retained in position by a locking plate 79. A portion of the trunnion 77 extends inwardly of the yoke 76 into a hub portion of the cage 74 and in which it is rotatable about an axis at right angles to the common axis of the driving and driven shafts 14 and 33. The trunnion 78 is similarly mounted on the shift yoke 76 and rotatably connected with the cage 74 at the opposite side of the latter to support the yoke 76 for pivotal movement relative to the cage about the common axis of the trunnions 77, 78. It will be noted that the shift yoke 76 is thus entirely supported on the driving shaft 14, and that the connections at diametrically opposed points thereof with the cage 74 permit swinging movement of the yoke on an axis intersecting the longitudinal axis on which the cage 74 is rotatably connected with the thrust collar 71.

A pair of relatively abuttable thrust buttons 81 and 82 are mounted on the shift yoke 76 and on the bearing retainer 18, respectively, below the common axis of the driving and driven shafts 14 and 33, and the thrust buttons 81 and 82 are cooperative, upon relative engagement thereof, to limit pivotal movement of the yoke 76 about the common axis of the trunnions 77 and 78. A stud 83 is mounted on the yoke 76 in diametrically opposed relation to the thrust button 81 and has a ball head for cooperation with a suitable actuating mechanism, not shown, which is operable to swing the yoke 76 about the common axis of the trunnions 77 and 78.

From the foregoing explanations, it will be apparent that swinging movement of the yoke 76 in the direction of arrow A in Fig. 1 will be effective to release the clutch disks 57, 58 from the pressure of the coil springs 61, the thrust collar 71 having a short but sufficient range of axial movement relative to the driving hub member 43 to engage and disengage the clutch unit by back and forth movement of the yoke 76 about the axis of the trunnions 77 and 78.

Referring to Fig. 2, the driving and driven hub members 43 and 48 are shown in this figure at the same axial spacing from each other as in Fig. 1, and the shift yoke 76 is also shown in the same position in which it is shown in Fig. 1 and which corresponds to the fully engaged condition of the clutch unit. However, the inner and outer clutch drums 54 and 56 of the clutch unit are shown in a position of axial displacement relative to each other and of radial displacement relative to the driving and driven hub members 43 and 48, as compared with the showing in Fig. 1. In order to prepare the clutch unit for movement into the position in which it is shown in Fig. 2 it is only necessary to remove the cap screws 67 shown in Fig. 1 from the inner clutch drum, to remove the cap screws 69 from the outer clutch drum, and then slide the outer clutch drum axially relative to the inner clutch drum so as to telescope the two clutch drums into the axially contracted relation to each other in which they are shown in Fig. 2. Such axial contraction of the clutch drums may be effected without interference by the disk assembly 57, 58 and without interference by the loading mechanism which is operatively mounted on the inner clutch drum and which includes the thrust plate 59, the coil springs 61, the spacers 62, the abutment ring 63 and the bolts 64. It will also be noted that the clutch drums 54 and 56 in their relatively contracted position as shown in Fig. 2 are entirely free of the beads 66 and 68, and that the clutch unit in its contracted condition has adequate clearance at both sides to permit radial movement thereof into and out of the space between the hub members 43 and 48. The opening 13 in the top wall 2 of the transmission housing is suitably proportioned to permit removal of the clutch unit from the clutch compartment 8, and a rope or belt is preferably placed around the clutch unit in order to lift it out of the clutch compartment.

On the other hand, in order to install the clutch unit between the driving and driven hub members 43 and 48, the clutch unit may be lowered in its contracted condition into the space between said hub members, and the drums 54 and 56 may then be engaged with the centering beads 66 and 68, respectively, and secured in operative position. This may be done by first engaging one of the drums with its respective centering bead and securing it in fixed position by installing one or more respective cap screws, and by then axially shifting the other drum to engage it with its respective centering bead on the other hub member and securing it in axially fixed position by installation of respective cap screws. The relative shifting movement of the inner and outer clutch drums to operatively position the clutch unit between the driving and driven hub members 43 and 48 places the clutch unit into an expanded condition, and it will be noted that the hereinbefore mentioned loading mechanism for the clutch disk assembly 57, 58 will be operable in such expanded condition of the clutch unit to selectively establish and interrupt a driving connection between the inner and outer drums upon swinging movement of the shift yoke 76 in opposite directions about the axis of the trunnions 77, 78.

From the foregoing explanations, it will be apparent that the clutch installation as shown in the drawings permits ready removal of the clutch unit from the driving and driven hub members 43 and 48 without dismounting the thrust collar 71, or the cage 74 or the shift yoke 76, all of which parts may remain in installed position within the clutch compartment 8. It will be noted that this result is accomplished by arranging the clutch unit and the throw-out mechanism in radially separable relation to each other. To provide for such separable relation, the thrust fingers 72 of the thrust collar 71 and the abutment ring 63 are arranged in endwise contacting relation to each other and suitably proportioned so that, when the clutch unit is adjusted to its axially contracted condition, as explained hereinbefore in connection with Fig. 2, the abutment ring 63 simply moves away from the thrust fingers 72 of the thrust collar 71 and the latter will not interfere with the radial removal of the clutch unit.

Upon removal of the clutch unit from the space between the hub members 43 and 48, the cap screws 47 and 52 which retain the hub members on their respective shafts become readily accessible, and if desired, the installation may then further be dismantled for the purpose of removing other parts of the mechanism. If it is desired to remove the driven shaft and final drive pinion, the hub member 48 is preferably first disconnected from the shaft 33 and moved out of the clutch compartment 8. The cap screws 39 for the bearing retainer 38 are then readily accessible and may be removed in order to take out the bearing retainer 38. The shaft 33 and the pinion 32 may then be withdrawn from the final drive compartment 9 into the clutch compartment 8 and removed through the top opening 13. When the shaft 33 is withdrawn into the clutch compartment 8, the outer race of the roller bearing 37 will be pushed out of its seat on the wall 11 while the outer race of the roller bearing 36 may remain in position on the outer wall 34 of the final drive compartment 9.

In connection with the description of the driven hub member 48, it has been mentioned hereinbefore that this hub member has a circumferential series of apertures 49. These apertures in conjunction with the apertures 44 of the driving hub member 43 provide for circulation of air through the interior of the clutch unit, and it will be noted that there is ample space inside of the inner clutch drum 54 to provide for adequate dissipation of heat by such air circulation. As shown in Fig. 2, the outer clutch drum 56 is provided with a circumferential series of holes 84 which, while assisting ventilation of the clutch unit, also facilitate turning of the clutch unit by means of a bar when it is desired to bring the cap screws 67 and 69 into easy reach from the top opening 13.

It will further be noted that the transverse width of the clutch compartment 8, that is, the spacing between the partition 4 and the wall 11, which is required to accommodate the entire clutch installation including the throw-out mechanism, is relatively short, and that the transmission housing 1 may therefore be constructed readily to meet existing requirements for a minimum over-all width transversely of the tractor. The outer drum 56 of the clutch unit may be utilized to serve as a brake drum in the customary manner, that is, a brake mechanism, not shown, may be installed within the clutch compartment 8, for cooperation with the outer circumferential surface of the clutch drum 56.

It should be understood that it is not intended to limit the invention to the particular forms and details described hereinabove and that the invention includes such other forms and modifications as are embraced by the scope of the appended claims.

It is claimed and desired to secure by Letters Patent:

1. A clutch installation comprising, in combination, a pair of axially spaced driving and driven elements mounted for relative rotation and in axially fixed relation to each other, a clutch unit adapted for radial movement into and out of the space between said driving and driven elements and comprising, axially overlapping inner and outer clutch drums each having an axial length shorter than the axial width of said space, an assembly of selectively engageable and disengageable annular clutch plates mounted on said inner drum in surrounding relation thereto and at a predetermined axial spacing from one end of the latter, resilient loading means for said clutch plate assembly including an axially shiftable thrust plate within said inner drum, separable connecting means securing said inner drum at said one end thereof to one of said driving and driven elements in an axially fixed position in which said inner drum extends in axially overhanging relation to said one element and terminates within said space at a predetermined axial distance from the other of said elements, drive transmitting means operatively connecting said outer drum at its inner periphery in axially shiftable relation with said clutch plate assembly, said outer drum having an end portion which in an axially adjusted operative position of said outer drum projects axially beyond said clutch plate assembly and beyond the free end of said inner drum, and said drive transmitting means permitting shifting movement of said outer drum from said axially adjusted position toward said one end of said inner drum, other separable connecting means securing said outer drum at said one end thereof in said axially adjusted position to said other element, bearing means independent of said inner and outer clutch drums and connected with one of said driving and driven elements in nonobstructing relation to said space, and a mechanism for releasing said loading means comprising a throwout collar having a hub portion supported for axial back and forth movement on said bearing means and having a thrust transmitting portion extending from said hub portion into cooperative engagement with said thrust plate of said loading means.

2. A clutch installation as set forth in claim 1, in which one of said driving and driven elements comprises a shaft having a radially enlarged hub member; in which detachable fastening means for securing one of said drums to said hub member operatively engage the latter at its outer periphery, and in which said throwout collar is supportedly mounted at the axially outer side of said hub member and has thrust fingers extending through said hub member at points radially between said shaft and said outer periphery of said hub member.

3. A clutch installation as set forth in claim 1, in which one of said driving and driven elements comprises a shaft having a radially enlarged hub member, in which detachable fastening means for securing said inner drum to said hub member operatively engage the latter at its outer periphery, and in which said throwout collar is supportedly mounted at the axially outer side of said hub member and has thrust fingers extending through said hub member at points radially between said shaft and said outer periphery of said hub member.

4. A clutch installation comprising, in combination, a support, a pair of axially spaced driving and driven elements mounted in axially fixed positions on and for rotation independently of each other relative to said support; a clutch unit comprising a pair of relatively rotatable axially overlapping radially inner and outer clutch parts adapted for axial contracting and expanding adjustment relative to each other and each having an axial length shorter than the axial spacing between said driving and driven elements; axial, radial and torque load transmitting separable connecting means associated with and operative to detachably secure said inner clutch part to one of said driving and driven elements in an axially fixed position in which said inner clutch part extends axially from said one element toward and is spaced a predetermined axial distance from the other of said driving and driven elements; other axial, radial and torque load transmitting separable connecting means associated with and operative to detachably secure said outer clutch part to the other of said driving and driven elements in an axially fixed position in which said outer clutch part extends axially from said other element toward and is spaced a predetermined axial distance from said one element; at least one of said first and second mentioned connecting means being operable to release its associated clutch part for axial contracting movement of the latter relative to the other of said clutch parts, so that upon separation of both of said connecting means said inner and outer clutch parts may be moved, in axially contracted condition, radially out of the space between said driving and driven elements; selectively engageable and disengageable clutch means operatively interposed between said inner and outer clutch parts and adapted to accommodate said axial contracting and expanding movement of said inner and outer clutch parts; loading means for said clutch means mounted for radial movement in unison with said inner and outer clutch parts out of said space; and a control mechanism for said loading means comprising a clutch throw-out collar having a hub portion axially outside of said space and a thrust transmitting portion extending axially from said hub portion into cooperative engagement with said loading means, and bearing means connecting said hub portion of said throw-out collar in radial load transmitting and axially shiftable relation to said support independently of said inner and outer clutch parts.

5. A clutch installation as set forth in claim 4, in which said control mechanism comprises means mounting said throw-out collar on one of said driving and driven elements for rotation therewith and for axial back and forth movement relative thereto, a cage element supportedly mounted on said collar in rotatively loose and axial thrust transmitting relation thereto, a shift element, pivot means supportedly mounted on said cage element and operatively engaging said shift element so as to sustain said shift element on said cage element independently of said support, for swinging movement relative to said cage element on an axis extending transversely of the axis of rotation of said collar, said shift element having an actuating arm extending radially of the axis of said pivot means in one direction and a lever arm extending radially of the axis of said pivot means in the opposite direction, and a stationary abutment mounted on said support in the path of swinging movement of said lever arm and contactable by a portion of the latter at a predetermined radial spacing from the axis of said pivot means upon swinging movement of said shift element on said axis of said pivot means in one direction.

6. A clutch installation as set forth in claim 5, in which said throw-out collar has thrust fingers projecting axially at one side of said shift element, and in which said stationary abutment is mounted on said support in confronting relation to the other side of said shift element.

7. A clutch installation for motor vehicles comprising, in combination, a pair of axially spaced driving and driven shafts mounted for relative rotation about a common axis and in axially fixed relation to each other, axially fixed driving and driven hub members connected, respectively, with said shafts at the relatively opposed and axially spaced ends of the latter, a friction clutch unit adapted for radial movement into and out of the space between said hub members and comprising axially overlapping inner and outer clutch drums each having an axial length shorter than the axial spacing between said shafts and shorter than the axial spacing between the axially inner sides of said hub members, an assembly of selectively engageable and disengageable annular clutch plates mounted on said inner drum in surrounding relation thereto and at a predetermined axial spacing from one end of the latter, axially separable centering means integrally formed, respectively, with said one end of said inner drum and with one of said hub members and cooperative with each other to radially position said inner drum in accurately concentric relation with said common axis at the axially inner side of said one hub member, drive transmitting means operatively connecting said outer drum at its inner periphery in axially shiftable relation with said clutch plate assembly, said outer drum having an end portion which in an axially adjusted operative position of said outer drum projects axially beyond said clutch plate assembly and beyond the free end of said inner drum, and said drive transmitting means permitting shifting movement of said outer drum from said axially adjusted position toward said one end of said inner drum, axially separable centering means integrally formed, respectively, with said one end of said outer drum and with the other of said hub members and cooperative with each other to radially position said outer drum in accurately concentric relation with said common axis at the axially inner side of said other hub member, detachable fastening means for securing said inner drum in axially fixed position on said one hub member, detachable fastening means for securing said outer drum in said axially adjusted position thereof on said other hub member, and a control mechanism for said clutch unit comprising a throw-out collar having a hub portion surrounding one of said driving and driven shafts, and a thrust transmitting portion extending from said hub portion toward the other of said driving and driven shafts, bearing means operatively interposed between said hub portion and said one shaft in non-obstructing relation to said space and accommodating axial back and forth shifting movement of said throw-out collar, and clutch release means disposed within said space for actuation by said thrust transmitting portion of said throw-out collar.

WILLIAM F. WILSON.

REFERENCES CITED

The following references are of record in the file of this patent:

UNITED STATES PATENTS

| Number | Name | Date |
| --- | --- | --- |
| 671,602 | Levalley | Apr. 9, 1901 |
| 920,841 | Duryea et al. | Mar. 4, 1909 |
| 1,009,702 | Utz | Nov. 21, 1911 |
| 1,305,029 | Tibbetts | May 27, 1919 |
| 1,675,703 | Gade | July 3, 1928 |
| 1,803,077 | Spase | Apr. 28, 1931 |
| 2,157,429 | Padden | May 9, 1939 |
| 2,197,289 | Baker et al. | Apr. 16, 1940 |
| 2,403,322 | Acton | July 2, 1946 |

OTHER REFERENCES

Catalog C., 02-form 6289, page 18, published by Caterpillar Tractor Co., Peoria, Illinois. Title, "The Caterpillar Diesel D-7 Tractor."